United States Patent
Yang et al.

(10) Patent No.: US 11,138,774 B2
(45) Date of Patent: Oct. 5, 2021

(54) VISUAL INSPECTION METHOD FOR GRAPHS PICTURES IN INTERNET BROWSER

(71) Applicant: INTEL CORPORATION, Santa Clara, CA (US)

(72) Inventors: Wenlong Yang, Shanghai (CN); Anbang Yao, Shanghai (CN); Avi Nahmias, Gan Yavne (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/644,088

(22) PCT Filed: Oct. 3, 2017

(86) PCT No.: PCT/CN2017/105248
§ 371 (c)(1),
(2) Date: Mar. 3, 2020

(87) PCT Pub. No.: WO2019/068215
PCT Pub. Date: Apr. 11, 2019

(65) Prior Publication Data
US 2020/0242821 A1    Jul. 30, 2020

(51) Int. Cl.
*G06T 11/20*    (2006.01)
*G06F 16/957*    (2019.01)
(Continued)

(52) U.S. Cl.
CPC .......... *G06T 11/206* (2013.01); *G06F 16/908* (2019.01); *G06F 16/9024* (2019.01); *G06F 16/9577* (2019.01)

(58) Field of Classification Search
CPC combination set(s) only.
See application file for complete search history.

(56) References Cited

U.S. PATENT DOCUMENTS

| | | | | |
|---|---|---|---|---|
| 5,339,392 A | * | 8/1994 | Risberg | ................. G06F 3/0481 715/762 |
| 5,550,964 A | * | 8/1996 | Davoust | ................. G06F 40/18 345/440 |

(Continued)

FOREIGN PATENT DOCUMENTS

| | | |
|---|---|---|
| CN | 101072289 | 11/2007 |
| WO | 2019068215 | 4/2019 |

OTHER PUBLICATIONS

"International Application Serial No. PCT CN2017 105248, International Search Report dated Jul. 9, 2018", 4 pgs.

(Continued)

*Primary Examiner* — Motilewa Good Johnson
(74) *Attorney, Agent, or Firm* — Schwegman Lundberg & Woessner, P.A.

(57) ABSTRACT

Techniques are disclosed for analyzing a graph image in a disconnected mode, e.g., when a graph is rendered as .jpeg, .gif, .png, and so on, and identifying a portion of the graph image associated with a plot/curve of interest. The identified portion of the graph image may then be utilized to generate an adjusted image. The adjusted image may therefore dynamically increase visibility of the plot/curve of interest relative to other plots/curves, and thus the present disclosures provides additional graph functionalities without access to the data originally used to generate the graph. The disconnected graph functionalities disclosed herein may be implemented within an Internet browser or other "app" that may present images depicting graphs to a user.

25 Claims, 8 Drawing Sheets

(51) Int. Cl.
*G06F 16/901* (2019.01)
*G06F 16/908* (2019.01)

(56) References Cited

U.S. PATENT DOCUMENTS

| | | | | |
|---|---|---|---|---|
| 5,619,631 A * | 4/1997 | Schott | ................... | G06F 40/177 |
| | | | | 345/440 |
| 6,020,898 A * | 2/2000 | Saito | ...................... | G06Q 10/10 |
| | | | | 345/440 |
| 6,195,103 B1 * | 2/2001 | Stewart | ................ | G06T 11/206 |
| | | | | 345/440 |
| 7,292,245 B2 * | 11/2007 | Goggin | ................ | G06T 11/206 |
| | | | | 345/440 |
| 7,750,908 B2 * | 7/2010 | Kincaid | ................ | G06T 11/206 |
| | | | | 345/440 |
| 2008/0062177 A1 | 3/2008 | Gaul et al. | | |
| 2014/0301621 A1 | 10/2014 | Lu et al. | | |
| 2014/0347388 A1 | 11/2014 | Friedman et al. | | |

OTHER PUBLICATIONS

"International Application Serial No. PCT CN2017 105248, Written Opinion dated Jul. 9, 2018", 3 pgs.
"International Application Serial No. PCT CN2017 105248, International Preliminary Report on Patentability dated Apr. 16, 2020", 5 pgs.

* cited by examiner

40

```
<!DOCTYPE html>
<html>
<body>

<h2>IO Over Last 6 Hours</h2>
<img src="graph.jpg" graph-image="true" graph-background="white"
    style="width:304px;height:228px;">

</body>
</html>
```

```
<!DOCTYPE html>
<html>
<body>

<h2>IO Over Last 6 Hours</h2>
<img src="graph.jpg" graph-image="true" graph-background="white" legend-
    entries="{director-1-1-A, #FF0000}" style="width:304px;height:228px;">

</body>
</html>
```

VISUAL INSPECTION METHOD FOR GRAPHS PICTURES IN INTERNET BROWSER

FIELD

The present disclosure is generally directed to machine-vision techniques for analyzing rendered graphs depicting one or more plots/curves, and in particular, to techniques for visually inspecting image data associated with a rendered graph to identify and isolate a selected plot/curve for purposes of further analysis and/or presentation to a user.

BACKGROUND

Graphs are mathematical abstractions that are useful for solving many types of problems in computer science. In computer programs, graphs are often utilized to represent meaningful information to a user. Often, graph rendering libraries are utilized to interpret data points (or mathematical functions/formulas) and may be used to produce an image showing, for instance, one or more axis, one or more plots along each axis, and a legend. Numerous software libraries exist for rendering graphs into a visual form, e.g., as a Photographic Experts Group (JPEG), a Graphics Interchange Format (GIF), a Portable Network Graphics (PNG), or a bitmap file, or other suitable format.

However, after rendering a graph into an image file the underlying data for the graph becomes disconnected, which is to say the image has no connection back to the underlying data itself and is merely a representation thereof. Re-rendering of a graph into an image is often necessary to make certain curves of interest more visible or to otherwise "drill down" to allow a user to analyze the graph in a meaningful manner. For instance, graphs with many sources of data, and by extension many curves, may be difficult to read as pixels from one curve may overlap others. Thus, a user may re-render a graph a number of times based on the underlying data until the curve(s) of interest are visible or otherwise distinguishable. Unfortunately, in some scenarios such re-rendering may not be practical or otherwise possible. For example, graphs commonly appear within websites and other information published on the Internet. These graphs may therefore have limited usability as a user is essentially "stuck" with the graphs in their rendered and disconnected form.

BRIEF DESCRIPTION OF THE DRAWINGS

FIG. 4A shows an example hyper-text markup language (HTML) document in accordance with an embodiment of the present disclosure.

FIG. 4B shows another example hyper-text markup language (HTML) document in accordance with an embodiment of the present disclosure.

Figure 1:
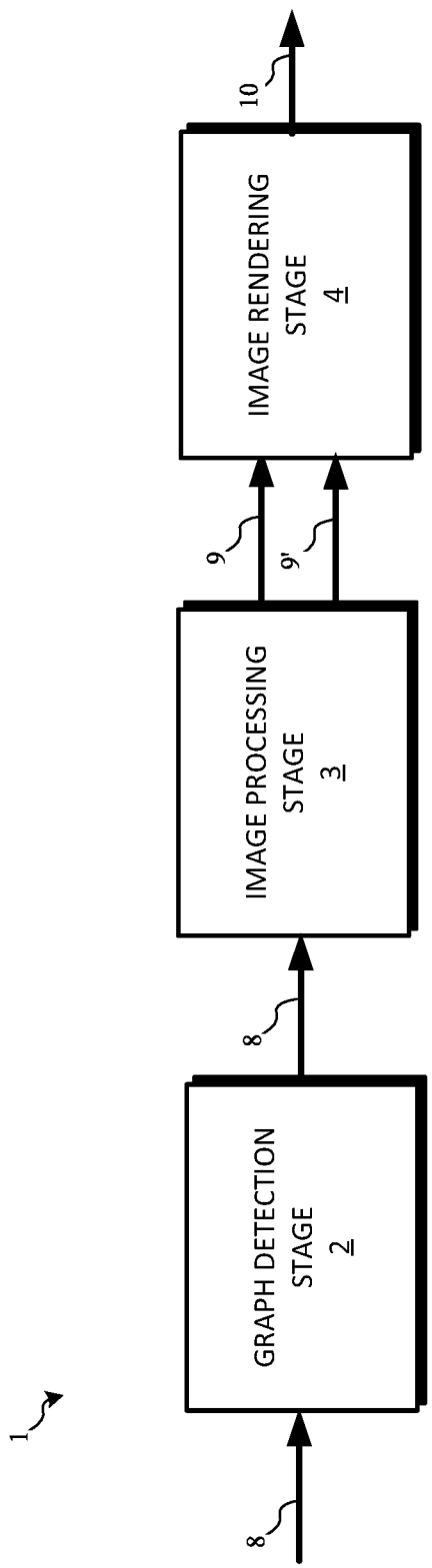
FIG. 1 shows a block diagram illustrating a plurality of stages for analyzing an image file that depicts one or more graphs, in accordance with an embodiment of the present disclosure.

These and other features of the present embodiments will be understood better by reading the following detailed description, taken together with the figures herein described. The accompanying drawings are not intended to be drawn to scale. In the drawings, each identical or nearly identical component that is illustrated in various figures is represented by a like numeral. For purposes of clarity, not every component may be labeled in every drawing.

DETAILED DESCRIPTION

Graphs are often rendered in Internet applications/sites as image files. However, such graphs are limited unless a connection back to a server (or other data source) may be utilized to perform additional queries. For instance, in a connected-mode, i.e., when an underlying data source is available, JQuery, Ajax, or other technologies may be used to allow a user to target a curve on the graph to present hover-over information or otherwise adjust the graph for additional analysis.

Figure 2A:
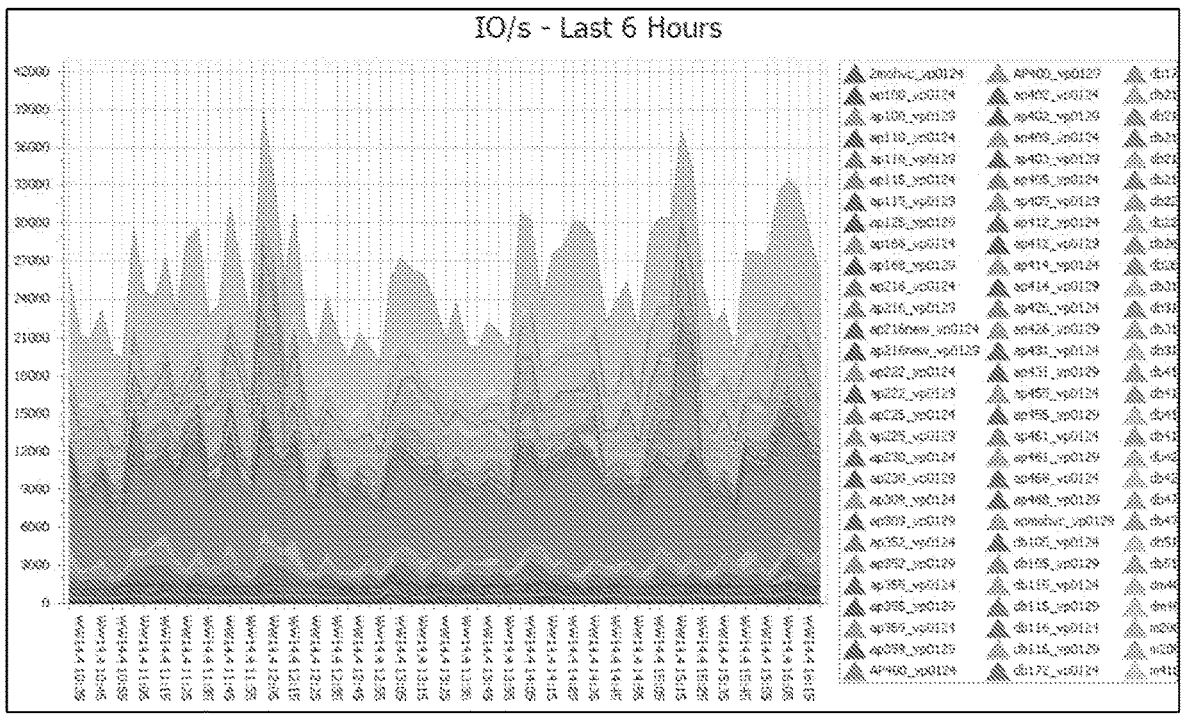
FIG. 2A shows an example image file depicting a graph having numerous data sources and associated curves.
Figure 2B:
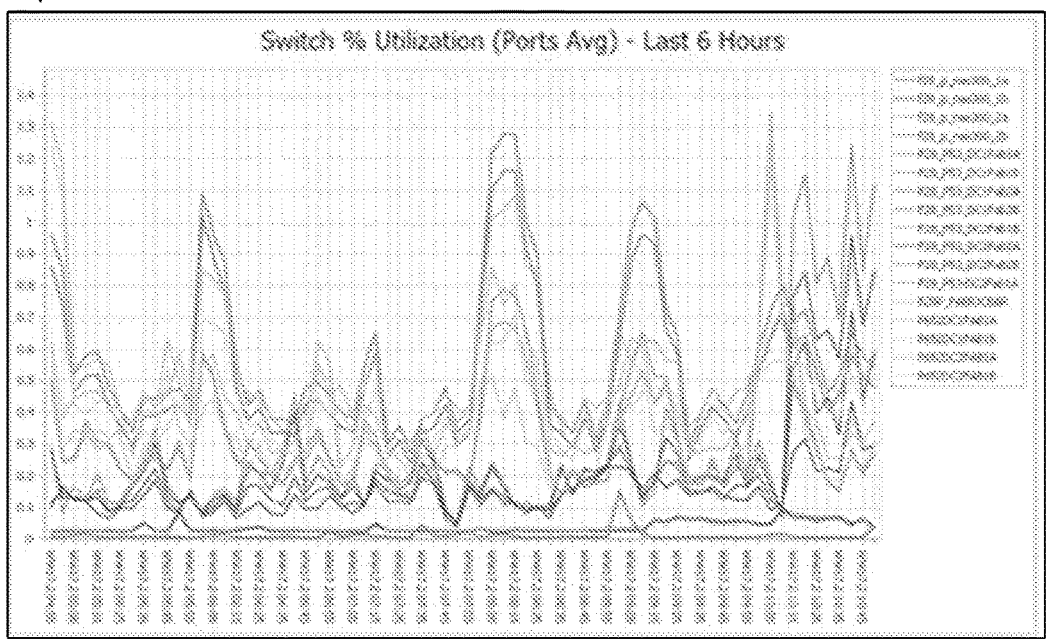
FIG. 2B shows another example image file depicting a graph having numerous data sources and associated curves.

On the other hand, disconnected graphs visualized within image files, e.g., .jpeg, .gif, and .png, images, make it difficult or sometimes impossible for users to glean meaningful information as curves/plots may be densely packed within a relatively small number of pixels. For example, graph images 21 and 22 shown in FIGS. 2A and 2B, respectively, illustrate this problem. As shown, graph 21 includes numerous data sources with a proportional number of curves. Meaningful analysis of a particular curve, or set of curves, is simply not practical. Likewise, the graph image 22 of FIG. 2B includes numerous curves which overlap at various points along each plot. The relatively dense plots may render the graph image 22 unusuable when a user desires to differentiate one plot from others.

Thus, in accordance with an embodiment of the present disclosure, techniques are disclosed for analyzing a graph image in a disconnected mode, e.g., when a graph is rendered as .jpeg, .gif, .png, and so on, and identifying a portion of the graph image associated with a plot/curve of interest. The identified portion of the graph image may then be utilized to generate an adjusted image. The adjusted image may therefore dynamically increase visibility of the plot/curve of interest relative to other plots/curves, and thus the present disclosures provides additional graph functionalities without access to the data originally used to generate the graph. The disconnected graph functionalities disclosed herein may be implemented within an Internet browser, or other so-called "app" that may present images depicting graphs to a user.

In more detail, a plurality of processing stages are disclosed herein that may be implemented in hardware (e.g., circuitry), software, or a combination thereof. In one specific example embodiment, the plurality of processing stages may be implemented in a software library and instantiated by, for example, an Internet browser such as Mozilla Firefox™ and Google Chrome™, just to name a few. The processing stages may be configured to identify image files depicting graph(s) therein based on metadata tags, e.g., attributes in HTML or other suitable language. The tags may further define one or more sources within the graph and a corresponding plot/curve identifier for each source, e.g., similar to a graph legend. For example, the markup language may define a plurality of source names and a corresponding color or other identifying property such as a line type for each of the curves in the graph. Thus, in a general sense, this metadata may provide a plurality of definitions that may be utilized as "hints" to allow the processing stages to efficiently identify plots/curves of interest in a graph. Alternatively, or in addition, the processing stages operate without a priori knowledge and may infer a graph is present in an image. Likewise, the processing stages further utilize algorithms, computer-vision techniques, probabilities and/or heuristics to differentiate portions of an image, e.g., pixels, associated with a plot/curve of interest relative to other unassociated portions.

Once identified, the processing stages may enable user interaction with a graph image to allow a user to select a particular plot/curve of interest for further processing. For example, the processing stages enable mouse-over events whereby a cursor dragged over a particular plot/curve of interest may be detected, and in response thereto, the processing stages may perform additional processing. A plot/curve of interest may be identified based on the cursor being over a pixel having a color associated with a plot/curve of the graph. Such identification may be based on metadata definitions, as discussed above, or through other empirical and/or heuristic methods as variously disclosed herein.

In any event, the processing stages, and more specifically an image processing phase, may then identify pixels associated with the plot/curve of interest, and conversely, identify pixels unassociated with the plot/curve of interest. The image processing stage may then adjust the associated pixels to increase visibility of the plot/curve of interest, e.g., by brightening each pixel, changing a pixel color, changing a line type between data points, darkening lines connecting data points, or any combination thereof. Alternatively, or in addition, unassociated pixels may be adjusted to decrease visibility, e.g., by muting pixel colors, setting pixel color values to a background color, and so on.

An image rendering stage may then receive pixel data from the image processing stage, and may then generate an adjusted image based on the adjusted associated pixels and/or adjusted unassociated pixels. The generated image may be encoded in the same format as the original image, or may be a different format depending on the particular application. The generated image may then be displayed in place of the original image or otherwise made visible. For example, the generated image may be aligned with the position of the original image such that the user perceives a visual change in the graph without necessarily understanding the original image was replaced. Thus, the position of the cursor may remain over the plot/curve of interest with the same being highlighted or otherwise made more perceivable to the user. In other cases, a pop-up window or other overlay may visualize the adjusted image with all, or a portion, of the original image remaining visible.

As generally referred to herein, the term disconnected generally refers to a graph image that no longer has connection to an underlying data source that was used to generate the graph. Therefore, disconnected operations/queries variously described herein include utilizing the pixel/image data either alone or in combination with metadata, e.g., HTML, attributes, XML, and so on, rather than queries to a dataset/database originally utilized to generate the graph. However, it should be appreciated that aspects and embodiments disclosed herein may be utilized in combination with so-called "connected" graph operations. For instance, the disconnected operations disclosed herein may be utilized in some instances where the original data is available to render a graph but disconnected operation is desirable. Connected operations often have significant costs, e.g., require time and computer resources to make connection with a data source/database (e.g., via a network such the Internet), analyze the relevant data, and render a graph. Embodiments disclosed herein advantageously provide functionality without the latency and resource expenses associated with connected-operations, and may be used alone or in combination with other connected-operations depending on a desired application.

As generally referred to herein, the term plot refers to a set of points graphed on a coordinate plane, e.g., via Cartesian coordinates, elliptical coordinates, and so on, that may or may not be connected by a line. Plots may be generated by a function, or may simply be generated based on a dataset. Plots may also define one or more curves. The term curve generally refers to the graph of a function on a coordinate plane. However, curves may simply represent points within a dataset which are interconnected by lines that may not necessarily be represented as a function. Thus, straight lines, circles, and waves may all be accurately considered curves although the graphed lines may not necessarily resemble a line which bends in a smooth and continuous away.

Now referring to the figures, FIG. 1 shows a block diagram of a plurality of stages 1 for analyzing a graph image and rendering an adjusted graph image based on the same. As shown, the plurality of stages 1 may be instantiated in hardware, e.g., as circuitry, and/or in software. In one embodiment, the plurality of stages are implemented by a computer device, such as the computer device 900 of FIG. 8. For instance, the computer device 900 may instantiate an Internet browser application or so-called "app" that implements the plurality of stages 1.

Continuing on, a graph detection stage 2 may receive image data 8. Image data 8 may include, for example, a plurality of bytes associated with an image file such as a .jpeg, .gif, .png, or other image file. The image data 8 may further include metadata such as XML, JSON, HTML or other the like. The graph detection stage 2 may analyze the plurality of bytes to identify if one or more graphs are represented therein. In some cases, the graph detection stage 2 may further include analyzing the metadata associated with the image file to determine whether the image file includes a graph. For example, in instances where the plurality of stages 1 are used within an Internet Browser, a Hypertext Markup Language (HTML) tag may be analyzed to identify an attribute that indicates the presence of a graph (see FIGS. 4A and 4B).

In any event, the graph detection stage 2 may then detect one or more graphs within image data 8. When one or more graphs are detected within the image data, an image processing stage 3 may then set a flag or otherwise indicate the image data 8 includes one or more graphs.

After rendering the image data 8 to a webpage or other computer application, the image processing stage 3 may then be utilized when, for instance, a user-input event is detected which targets an on-screen image associated with image data 8. The user-input may include moving a cursor over a region of the targeted on-screen image, although other input may also be utilized such as a finger, stylus, etc.

In response to the detected user input, the image processing stage 3 may then perform pixel analysis, as variously described herein, to detect if the user-input is targeting a curve visualized within the on-screen image and to identify which portion of pixels are associated with the targeted curve. Likewise, pixels unassociated with the targeted curve may be identified as simply the remaining portion of the on-screen image. While specific scenarios and examples herein discuss targeting a curve, the embodiments disclosed herein are equally applicable to plots and other graph types.

In an embodiment, identification of associated pixels includes identifying a target pixel color value (or key pixel value) immediately adjacent the user-input, e.g., at the tip of the cursor, and iterating through all of the pixels of the image data 8 to identify those pixels which have the same, or substantially similar color value. This comparison may include, for example, subtracting the target pixel color value from each remaining pixel color value to determine a delta value (or difference), e.g., using a for-loop or other iterative process. The delta value may then be compared to a predefined threshold to determine if a given pixel within tolerance of the target pixel color value. For instance, a predefined threshold of 1, 5, 10, 15 or 20% may be utilized to identify pixels which are similar to that of the target pixel. In other cases, pixel color values are simply compared to determine equality.

In another embodiment, comparison may include consulting metadata definitions to determine if the pixel color value immediately adjacent the user input is equal to one of the defined graph sources. For instance, and as discussed in greater detail below with regard to FIGS. 4A and 4B, the metadata may include source identifiers 46. The source identifiers 46 may be used to determine if the user is targeting a pixel associated with a particular curve/plot, similar to how a user visually uses a graph legend. Then, an iterative process may be used to identify those pixels unassociated with the plot of interest, e.g., by identifying each pixel associated with other sources defined within the source identifiers 46. By way of example, a curve of interest may be defined in the source definitions as having a red pixel value e.g., #FF0000. Other curves may then be defined within the source identifiers 46 and may have color values set to, for example, yellow and blue. Therefore, associated pixels may be those that have a value set to red and unassociated pixels have a value associated with yellow and blue. Such comparison may be based on a predetermined threshold, as discussed above, in order to identify pixels that may not have the exact same color value but are within a particular tolerance. For example, light blue value may also qualify as blue, depending on the specific predetermined threshold utilized.

Continuing on with FIG. 1, the image processing stage 3 may then adjust each associated pixel and/or unassociated pixel to increase visibility of associated pixels and decrease visibility of unassociated pixels. Simply stated, the image processing stage 3 may alter pixel color values to increase a user's ability to perceive a curve of interest relative to other curves depicted within an on-screen image.

In an embodiment, each of the associated and unassociated pixels values may correspond with a Red, Green, Blue (RGB) value. To this end, each associated pixel color value may be set to a value which increases visibility. For instance, for RGB values, each of the R, G, B values may be multiplied by a value greater than 1.0 to increase brightness. Alternatively, or in addition, each unassociated pixel color value may be set to a value which decreases visibility. For instance, for RGB values of unassociated pixels, each R, G and B value may be multiplied by a value less than 1.0 to decrease brightness. Other pixel shifting techniques may be used and the provided examples are not intended to be limiting. In one specific example embodiment, the image processing stage 3 determines a background color value, e.g., based on heuristics or a probability distribution that suggests which pixel value is a background color, and sets each unassociated pixel color value to the identified background color value.

The image rendering stage 4 may then receive the identified associated pixels 9 and unassociated pixels 9' to generate an adjusted image 10. The adjusted image 10 may be the same format to that of the image data 9, e.g., a .jpeg, .gif, .png, and so on. In other cases, the image 10 may be a different format. In any event, the adjusted image 10 may include the same number of overall pixels as the image data 8, but with a target curve being more visually distinctive based on the pixel adjustments discussed above. The adjusted image 10 may also include a substantially similar height, width and position on the screen. Thus, the adjusted image 10 may replace the on-screen image associated with image data 8. However, this disclosure is not limited in this regard and the adjusted image 10 may be shown in addition to the original image.

In an embodiment, the adjusted image 10 is replaced with the original image on screen when, for instance, the focus of user-input moves away from a position within the boundaries adjusted image 10, e.g., by dragging a mouse away. In some cases, the adjusted image may permanently replace the previous/original image until user-input focuses on a different curve within adjusted image 10. In this instance, the adjusted image data 10 may be utilized as image data 8 for reprocessing. In still other cases, a timer may be utilized and after a predetermined period of time, e.g., 3 seconds, the adjusted image 10 may be replaced by the original image.

Some aspects of the present disclosure may be better understood by way of example. On example scenario for processing of a graph image will now be discussed in detail. However, this disclosure is equally applicable to any image including one or more graphs and the following example should not be construed as limiting.

Figure 3:
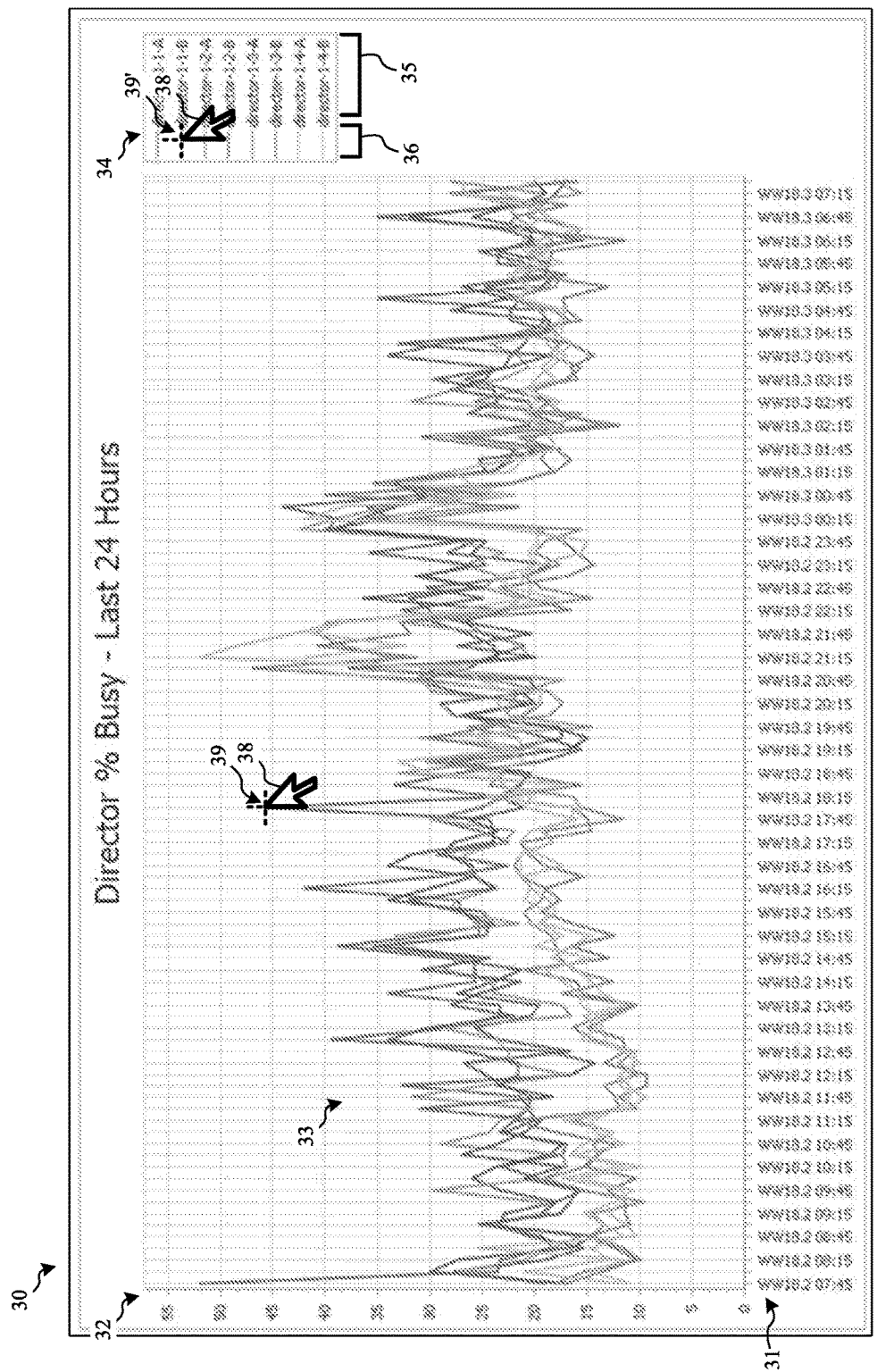
FIG. 3 shows an example image file depicting a graph that may be utilized by the plurality of stages shown in FIG. 1, in accordance with an embodiment of the present disclosure.

Turning to FIG. 3, an example graph image 30 is shown which is suitable for processing by the plurality of stages 1 shown in FIG. 1, in accordance with an embodiment of the present disclosure. As shown, the graph includes an X axis 31, a Y axis 32 and a plurality of plots 33, and a legend 34. The graph 30 may comprise, for instance, an image file such as .jpeg, .gif, .png or other suitable file that may be rendered by a computer for presentation for a user. For example, the graph 30 may be displayed within an internet browser (not shown) such as Mozilla Firefox™ and Google Chrome™. In other cases, the graph 30 may be displayed within a standard application run on the Windows™ operating system, for example.

In any event, the graph 30 may have been previously rendered based on a dataset, e.g., a flat-file dataset, from a database query, etc. However, the graph 30 may be "disconnected" after rendering in the sense that the graph 30 no longer has association with the underlying data set, e.g., the plurality of underlying data points, the function used to generate each curve/plot, and so on. Instead, the graph 30 may simply include a plurality of pixels that depict one or more plots along the X and Y axis 31, 32 respectively.

To aid a user in identifying which plots corresponds with a source of interest, the graph 30 includes a legend 34. The legend 34 includes one or more data source identifiers 35, with each data source identifier 35 being adjacent with a corresponding plot/curve identifier 36. In some cases, such as shown, each data source identifier is a visual representation of a specific plot/curve represented in the graph 30.

Thus, the visual representation of each plot may include a line which is visualized with a color utilized to render a plot within the plurality of plots 33, or other suitable representation that allows a user to identify which plot belongs to each data source. For example, the visual representation of each plot may include a similar line type to that of the rendered plot. Some such example line types may include, for instance, broken dashes, dash-dot, or other line patterns that allow one plot to be distinguished from others.

FIG. 4A shows an example HTML document 40 that may be utilized to render a graph image in accordance with embodiments of the present disclosure. As shown, the HTML document 40 includes an image tag "<img>" with an attribute defined as "graph-image." The graph-image attribute may include a value of true/false to allow an Internet browser to enable/disable graph image processing in accordance with the present disclosure. For example, a value of true may enable the plurality of stages discussed above with reference to FIG. 1.

FIG. 4B shows another example HTML document 47 that may be utilized to render a graph image in accordance with embodiments of the present disclosure. As shown, the HTML document 47 is substantially similar to that of the HTML document 40, but with the addition of a source identifier 46. The source identifier may define one or more sources within the graph to allow the plurality of stages 1 to identify pixels associated with a curve of interest. For example, and as shown, the source identifier 46 includes a single entry that defines source 'director-1-1-A' as having an associated pixel value of #FF0000 (Red). As previously discussed, the source identifier 46 may be used as meta data "hints" the plurality of stages 1 may utilize when identifying pixels associated with a curve of interest.

In operation, an Internet browser or other suitable application may parse a HTML, document, e.g., HTML document 40 or 47, and identify at least one graph image to load. For example, consider a scenario where the HTML document 40 causes an Internet browser to render an image of the graph shown in FIG. 3. In this scenario, the Internet browser may process the graph image 30 using the graph detection stage 2 to identify the graph illustrated therein, e.g., based on the HTML attribute 41. Then, the Internet browser may detect user input within the boundaries of the graph image 30. For example, a user may move a cursor 38 to a position 39 as shown in FIG. 3 to target a specific plot/curve of interest. In another example, the user may move the cursor 38 to a position '39 within a legend to target a plot/curve of interest.

The Internet browser may then utilize image processing stage 3 to identify a target pixel color value. For instance, position 39 may correspond with a red pixel value, e.g., Hex #FF0000 or RGB (255,0,0,0). The image processing stage 3 may then iterate through each pixel of graph image 30 to identify other associated pixels having the same, or substantially similar color (e.g., based on a threshold discussed above). Each pixel corresponds with an X/Y position relative to an origin (0,0) of the image. Thus, each identified pixel may then be extracted and held in memory, for example.

Figure 5:
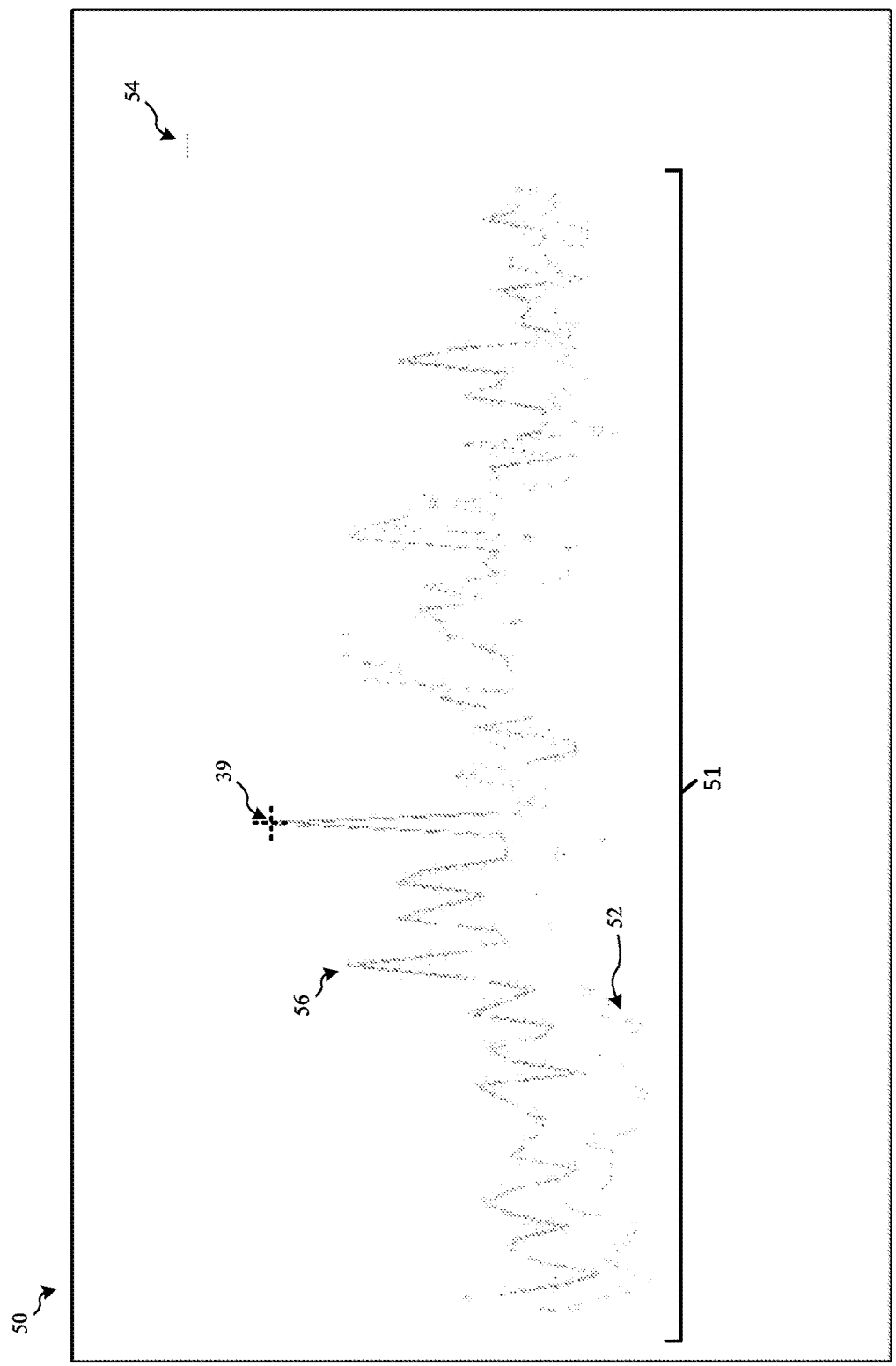
FIG. 5 shows an image file depicting a plurality of pixels identified as associated with a plot of interest within the graph image of FIG. 3, in accordance with an embodiment of the present disclosure.

FIG. 5 shows one example image 50 which illustrates pixels associated with position 39. As shown, the pixels 51 collectively form a plot/curve 56. The image processing stage 3 may perform additional processing to smooth out the curve of plot 56, e.g., to form a continuous curve by changing one or more background/unassociated pixels between associated pixels. Alternatively, or in addition, the image processing stage 3 may remove pixels which are identified as noise using, for instance, thresholding, heuristics, probability functions and pattern recognition techniques, just to name a few. In any such cases, noise pixels 52 may be removed (e.g., set to a background color) or simply ignored.

Continuing on, the processing stage 3 may then increase brightness or otherwise adjust each of the pixels 56 associated with the plot of interest. Brightness may be increased by a percentage, e.g., 5 to 20%, using pixel shifting (e.g., multiplication of RGB values) as discussed above. Notably, the pixels 54 associated with the legend 35 may also be adjusted in a similar fashion to increase clarity.

Alternatively, or in addition, the processing stage 3 may identify pixels associated with other plots (which may also be referred to as unassociated pixels) and reduce brightness of each. Unassociated pixels may be identified by, for example, utilizing the source identifier meta data discussed. Unassociated pixels may also be identified by first determining a background color and then finding all pixels with a value different from that of the background color and the target color, e.g., the color of the plot/curve of interest. The background color may be determined by, for instance, an attribute 45 in the HTML, document 40 shown in FIG. 4A. Alternatively, or in addition, the image processing stage 3 may algorithmically/heuristically determine a background color through probability distribution functions or other suitable approach. In some cases, the image processing stage 3 may simply assume the most common pixel color value is the background color or may default to a color, such as a white.

In any such cases, unassociated pixels may be identified and distinguished from background color pixels. Once identified, brightness may be decreased by a percentage, e.g., 5 to 20%, using pixel shifting (e.g., multiplication of RGB values) as discussed above. In some cases, each unassociated pixel color value may be set the background color, e.g., white or other background color.

Figure 6:
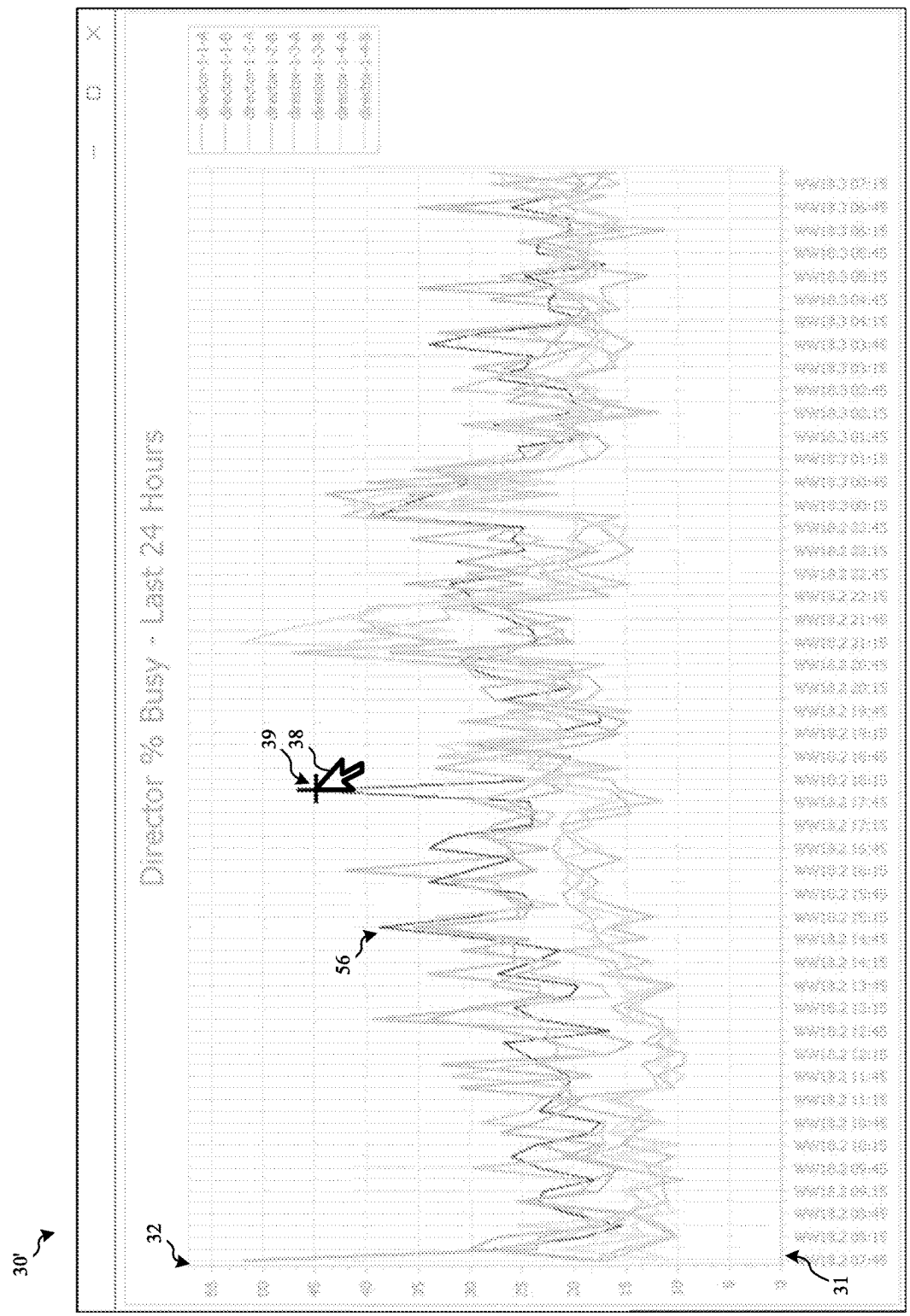
FIG. 6 shows an adjusted image of a graph of interest after processing by the plurality of stages of FIG. 1, in accordance with an embodiment of the present disclosure.

FIG. 6 shows an adjusted graph image 30' after rendering by, for example, the image rendering stage 4 of FIG. 1. As shown, the plot 56 includes pixel color values which are now perceivably brighter or otherwise distinguishable relative to the same plot shown in FIG. 3. In addition, unassociated pixels/portions of the graph 30' have had a reduction in brightness to further increase the contrast between those unassociated pixels and the pixels associated with plot 56. Thus, the plot/curve 56 may now be visible along its entire length including the peaks and valleys along the X and Y axis 31, 32 respectively.

Figure 7:
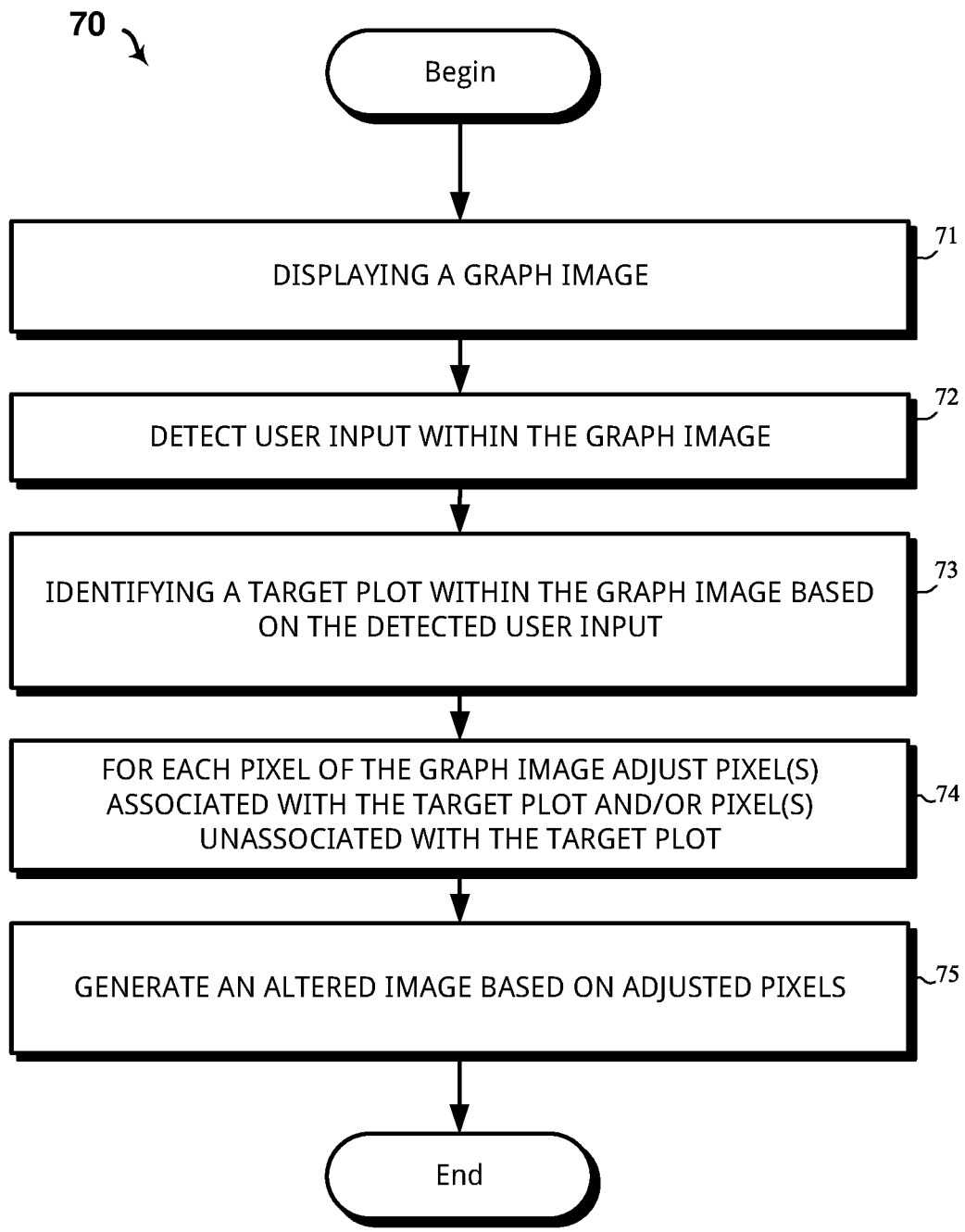
FIG. 7 shows an example method for analyzing a graph image in accordance with an embodiment of the present disclosure.

FIG. 7 shows an example method 70 for analyzing a graph image to generate an altered image, in accordance with an embodiment of the present disclosure. The method 70 may be performed by the computer system 900 of FIG. 8 in combination with the plurality of stages of FIG. 1. As shown, the method 70 includes displaying 71 an image depicting a graph which may also be referred to as an image graph. The graph image may include an attribute (or other meta data) that indicates the graph image includes one or more graphs, such as shown in FIG. 4.

User input 72 may then be detected within the boundaries of the image graph, e.g., based on a mouse or other pointing device. In response to the user data, the method 70 may then include identifying 73 a target plot/curve within the graph image based on the detected user input. Identifying may include, for instance, determining a pixel color value adjacent the position of a cursor and comparing the pixel color value to entries in a source identifier list. This pixel color value may be also referred to as a key pixel color value. Then, for each pixel of the graph image, adjusting 74 pixel(s) associated with the target plot/curve. In addition, adjusting 74 may include modifying pixels unassociated with the target plot/curve. For instance, unassociated pixels may be identified based on comparing pixels to entries in the source identifier list. Other approaches may be used to identify unassociated pixels, e.g., through empirical analysis and heuristics. The method 70 may then continue by generating 75 an altered image based on pixels adjusted in act 74. The altered image may then depict a graph with the plot/curve of interested highlighted or otherwise made more perceivable for a user.

Example System

Figure 8:
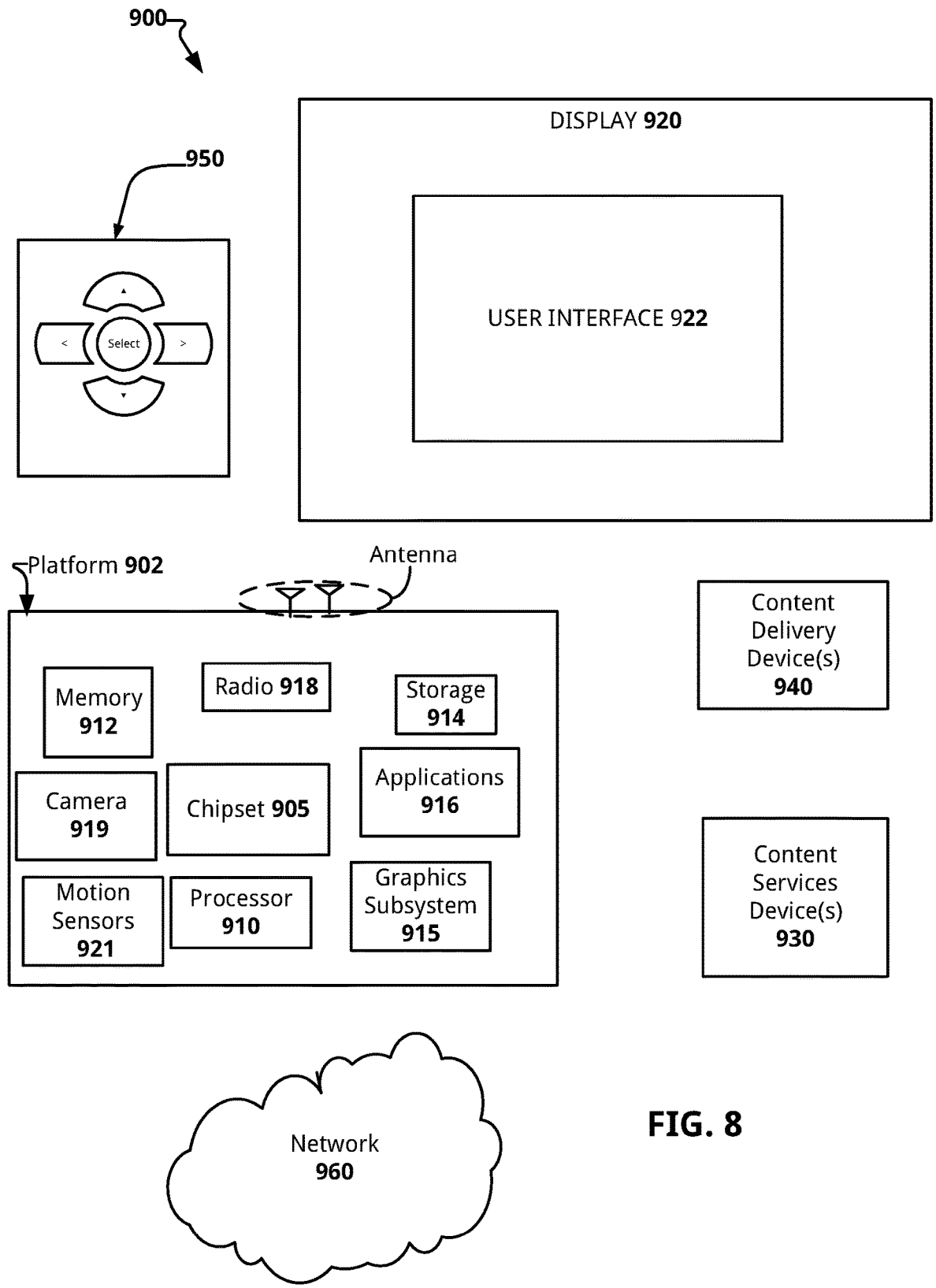
FIG. 8 shows an example computer system consistent with embodiments of the present disclosure.

FIG. 8 illustrates a computing system 900 configured to perform various processes disclosed herein and may implement the plurality of stages 1 in FIG. 1. In more detail, system 900 may be incorporated into a personal computer (PC), laptop computer, wearable computing device, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, set-top box, game console, or other such computing environments capable of performing graphics rendering operations and displaying content.

In some embodiments, system 900 comprises a platform 902 coupled to a display 920. Platform 902 may receive content from a content device such as content services device(s) 930 or content delivery device(s) 940 or other similar content sources. A navigation controller 950 comprising one or more navigation features may be used to interact with, for example, platform 902 and/or display 920, so as to supplement navigational gesturing by the user. Each of these example components is described in more detail below.

In some embodiments, platform 902 may comprise any combination of a chipset 905, processor 910, memory 912, storage 914, graphics subsystem 915, camera 919, motion sensors 921, applications 916 and/or radio 918 or wireless transceiver circuit. Chipset 905 may provide intercommunication among processor 910, memory 912, storage 914, graphics subsystem 915, applications 916 and/or radio 918. For example, chipset 905 may include a storage adapter (not depicted) capable of providing intercommunication with storage 914.

Processor 910 may be implemented, for example, as Complex Instruction Set Computer (CISC) or Reduced Instruction Set Computer (RISC) processors, x86 instruction set compatible processors, multi-core, or any other microprocessor or central processing unit (CPU). In some embodiments, processor 910 may comprise dual-core processor(s), dual-core mobile processor(s), and so forth. Memory 912 may be implemented, for instance, as a volatile memory device such as, but not limited to, a Random Access Memory (RAM), Dynamic Random Access Memory (DRAM), or Static RAM (SRAM). Storage 914 may be implemented, for example, as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In some embodiments, storage 914 may comprise technology to increase the storage performance enhanced protection for valuable digital media when multiple hard drives are included, for example.

Graphics subsystem 915 may perform processing of images such as still or video for display, and in some embodiments is configured to synthesize face images, as variously described herein. Graphics subsystem 915 may be a graphics processing unit (GPU) or a visual processing unit (VPU), for example. An analog or digital interface may be used to communicatively couple graphics subsystem 915 and display 920. For example, the interface may be any of a High-Definition Multimedia Interface, DisplayPort, wireless HDMI, and/or wireless HD compliant techniques. Graphics subsystem 915 could be integrated into processor 910 or chipset 905. Graphics subsystem 915 could be a stand-alone card communicatively coupled to chipset 905. The graphics and/or video processing techniques, including the techniques for identifying and producing preferred face orientations described herein, may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 918 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 918 may operate in accordance with one or more applicable standards in any version.

In some embodiments, content services device(s) 930 may be hosted by any national, international and/or independent service and thus accessible to platform 902 via the Internet or other network, for example. Content services device(s) 930 may be coupled to platform 902 and/or to display 920. Platform 902 and/or content services device(s) 930 may be coupled to a network 960 to communicate (e.g., send and/or receive) media information to and from network 960. Content delivery device(s) 940 also may be coupled to platform 902 and/or to display 920. In some embodiments, content services device(s) 930 may comprise a cable television box, personal computer, network, telephone, Internet enabled devices or appliance capable of delivering digital information and/or content, and any other similar device capable of unidirectionally or bidirectionally communicating content between content providers and platform 902 and/display 920, via network 960 or directly. It will be appreciated that the content may be communicated unidirectionally and/or bidirectionally to and from any one of the components in system 900 and a content provider via network 960. Examples of content may include any media information including, for example, video, music, graphics, text, medical and gaming content, and so forth.

Content services device(s) 930 receives content such as cable television programming including media information, digital information, and/or other content. Examples of content providers may include any cable or satellite television or radio or Internet content providers. The provided examples are not meant to limit the present disclosure. In some embodiments, platform 902 may receive control signals from navigation controller 950 having one or more navigation features. The navigation features of controller 950 may be used to interact with user interface 922, for example. In some embodiments, navigation controller 950 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures, facial expressions, or sounds.

Movements of the navigation features of controller 950 may be echoed on a display (e.g., display 920) by movements of a pointer, cursor, focus ring, or other visual indicators displayed on the display. For example, under the control of software applications 916, the navigation features located on navigation controller 950 may be mapped to virtual navigation features displayed on user interface 922, for example. In some embodiments, controller 950 may not be a separate component but integrated into platform 902 and/or display 920. Embodiments, however, are not limited to the elements or in the context shown or described herein, as will be appreciated.

In some embodiments, drivers (not shown) may comprise technology to enable users to instantly turn on and off platform 902 like a television with the touch of a button after initial boot-up, when enabled, for example. Program logic may allow platform 902 to stream content to media adaptors or other content services device(s) 930 or content delivery device(s) 940 when the platform is turned "off." In addition, chipset 905 may comprise hardware and/or software support for 5.1 surround sound audio and/or high definition 7.1 surround sound audio, for example. Drivers may include a graphics driver for integrated graphics platforms. In some embodiments, the graphics driver may comprise a peripheral component interconnect (PCI) express graphics card.

In various embodiments, any one or more of the components shown in system 900 may be integrated. For example, platform 902 and content services device(s) 930 may be integrated, or platform 902 and content delivery device(s) 940 may be integrated, or platform 902, content services device(s) 930, and content delivery device(s) 940 may be integrated, for example. In various embodiments, platform 902 and display 920 may be an integrated unit. Display 920 and content service device(s) 930 may be integrated, or display 920 and content delivery device(s) 940 may be integrated, for example. These examples are not meant to limit the present disclosure.

In various embodiments, system 900 may be implemented as a wireless system, a wired system, or a combination of both. When implemented as a wireless system, system 900 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 900 may include components and interfaces suitable for communicating over wired communications media, such as input/output (I/O) adapters, physical connectors to connect the I/O adapter with a corresponding wired communications medium, a network interface card (MC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 902 may establish one or more logical or physical channels to communicate information. The information may include media information and control information. Media information may refer to any data representing content meant for a user. Examples of content may include, for example, data from a voice conversation, videoconference, streaming video, email or text messages, voice mail message, alphanumeric symbols, graphics, images (e.g., selfies, etc.), video, text and so forth. Control information may refer to any data representing commands, instructions or control words meant for an automated system. For example, control information may be used to route media information through a system, or instruct a node to process the media information in a predetermined manner (e.g., using hardware assisted for privilege access violation checks as described herein). The embodiments, however, are not limited to the elements or context shown or described in FIG. 9.

As described above, system 900 may be embodied in varying physical styles or form factors. FIG. 9 illustrates embodiments of a small form factor device 900 in which system 900 may be embodied. In some embodiments, for example, device 900 may be implemented as a mobile computing device having wireless capabilities. A mobile computing device may refer to any device having a processing system and a mobile power source or supply, such as one or more batteries, for example.

As previously described, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In some embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 9, mobile electronic device 900 may comprise a housing 902, a display 904, an input/output (I/O) device 906, and an antenna 908. Device 900 also may comprise navigation features 912. Display 904 may comprise any suitable display unit for displaying information appropriate for a mobile computing device, which in one example embodiment is a touchpad display. I/O device 906 may comprise any suitable I/O device for entering information into a mobile computing device. Examples for I/O device 906 may include an alphanumeric keyboard, a numeric keypad, a touch pad, input keys, buttons, a camera, switches, rocker switches, microphones, speakers, voice recognition device and software, and so forth. Information also may be entered into device 900 by way of microphone.

Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, systems on-chip, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Whether hardware elements and/or software elements are used may vary from one embodiment to the next in accordance with any number of factors, such as desired computational rate, power levels, heat tolerances, processing cycle budget, input data rates, output data rates, memory resources, data bus speeds and other design or performance constraints.

Some embodiments may be implemented, for example, using a machine-readable medium or article which may store an instruction or a set of instructions that, if executed by a machine, may cause the machine to perform a method and/or operations in accordance with an embodiment of the present disclosure. Such a machine may include, for example, any suitable processing platform, computing platform, computing device, processing device, computing system, processing system, computer, processor, or the like, and may be implemented using any suitable combination of hardware and software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of executable code implemented using any suitable high-level, low-level, object-oriented, visual, compiled and/or interpreted programming language.

FURTHER EXAMPLE EMBODIMENTS

The following examples pertain to further embodiments, from which numerous permutations and configurations will be apparent.

Example 1 discloses a computer-implemented method for analyzing a rendered graph, comprising displaying a first image that depicts a graph having a plurality of plots, the first image having a plurality of pixels, determining, by a processor, a location of user-input corresponds with a first plot of the plurality of plots within the first image based on a first pixel at the location of the user-input, for each pixel of the plurality of pixels, identifying by the processor whether a pixel is associated with the first plot or unassociated with the first plot based on a value of the first pixel, and adjusting, by the processor, at least one pixel of the plurality of pixels based on the at least one pixel being identified as associated or unassociated with the first plot, and generating, by the processor, an altered image based at least in part on the at least one adjusted pixel, the altered image increasing visibility of the first plot.

Example 2 includes the subject matter of Example 1, further comprising determining the first image includes a graph based on metadata associated with the first image.

Example 3 includes the subject matter of Example 2, wherein the metadata comprises hypertext markup language (HTML).

Example 4 includes the subject matter of Example 2, wherein the metadata includes a source identifier, the source identifier providing one or more definitions that correlate a graph source with a color of a curve associated with the graph source.

Example 5 includes the subject matter of Example 2, wherein the metadata includes a background color value definition.

Example 6 includes the subject matter of any one of Examples 1-5, wherein identifying by the processor whether a pixel of the plurality of pixels is associated with the first plot includes determining whether the difference between a value of the pixel and the value of the first pixel is within a predefined threshold.

Example 7 includes the subject matter of any one of Examples 1-6, wherein identifying by the processor whether a pixel of the plurality of pixels is associated with the first plot includes determining whether a value of the pixel is equal to the value of the first pixel associated with the first plot.

Example 8 includes the subject matter of any one of Examples 1-7, wherein identifying by the processor whether a pixel of the plurality of pixels is unassociated with the first plot includes determining whether the difference between the value of the pixel and the value of the first pixel associated with the first plot exceeds a predefined threshold.

Example 9 includes the subject matter of any one of Examples 1-8, wherein identifying by the processor whether a pixel of the plurality of pixels is unassociated with the first plot includes determining whether a value of the pixel is not equal to the value of the first pixel associated with the first plot.

Example 10 includes the subject matter of any one of Examples 1-9, wherein the first image is associated with metadata, the metadata having at least one source definition that corresponds with a second plot depicted within the first image, the second plot being different than the first plot and having an associated pixel color value different than the value of the first pixel associated with the first plot.

Example 11 includes the subject matter of Example 10, wherein identifying by the processor whether a pixel of the plurality of pixels is unassociated with the first plot includes determining whether the difference between a value of the pixel and the pixel color value of the second plot is within a predefined threshold.

Example 12 includes the subject matter of Example 10, wherein identifying by the processor whether a pixel of the plurality of pixels is unassociated with the first plot includes determining whether the value of the pixel equal to the associated pixel color value of the second plot.

Example 13 includes the subject matter of any one of Examples 1-12, wherein each pixel of the plurality of pixels is a Red, Green, Blue (RGB) pixel value, and wherein adjusting, by the processor, the at least one pixel of the plurality of pixels based on the at least one pixel being identified as associated with the first plot includes multiplying each R, G and B value of the RGB pixel value by a predetermined value, the predetermined value being greater than 1.0 to increase pixel brightness.

Example 14 includes the subject matter of any one of Examples 1-13, wherein each pixel of the plurality of pixels is a Red, Green, Blue (RGB) pixel value, and wherein adjusting, by the processor, the at least one pixel of the plurality of pixels based on the at least one pixel being identified as unassociated with the first plot includes multiplying each R, G, and B value of the RGB pixel value by a predetermined value, the predetermined value being less than 1.0 to decrease pixel brightness.

Example 15 includes the subject matter of any one of Examples 1-14, wherein the first image is a Joint Photographic Experts Group (JPEG), a Graphics Interchange Format (GIF), a Portable Network Graphics (PNG), or a bitmap file.

Example 16 includes the subject matter of any one of Examples 1-15, further comprising displaying the altered image in an Internet browser application.

Example 17 discloses a system, the system comprising a memory, at least one processor coupled to the memory and configured to receive a first image that depicts a graph having a plurality of plots, the first image having a plurality of pixels, determine a location of user-input corresponds with a first plot of the plurality of plots within the first image based on a first pixel at the location of the user-input, for each pixel of the plurality of pixels, identify whether a pixel is associated with the first plot or unassociated with the first plot based on a value of the first pixel, and adjust at least one pixel of the plurality of pixels based on the at least one pixel being identified as associated or unassociated with the first plot, and generate an altered image based at least in part on the at least one adjusted pixel.

Example 18 includes the subject matter of Example 17, the processor further configured to determine the first image includes a graph based on metadata associated with the first image.

Example 19 includes the subject matter of Example 18, wherein the metadata comprises hypertext markup language (HTML).

Example 20 includes the subject matter of Example 18, wherein the metadata includes a source identifier, the source identifier providing one or more definitions that correlate a graph source with a color of a curve associated with the graph source.

Example 21 includes the subject matter of Example 18, wherein the metadata includes a background color value definition.

Example 22 includes the subject matter of any one of Examples 17-21, wherein identifying whether a pixel of the plurality of pixels is associated with the first plot includes determining whether a difference between the value of the pixel and the value of the first pixel associated with the first plot is within a predefined threshold.

Example 23 includes the subject matter of any one of Examples 17-22, wherein identifying whether a pixel of the plurality of pixels is associated with the first plot includes determining whether a value of the pixel is equal to the value of the first pixel associated with the first plot.

Example 24 includes the subject matter of any one of Examples 17-23, wherein identifying whether a pixel of the plurality of pixels is unassociated with the first plot includes determining whether the difference between a value of the pixel and the first pixel associated with the first plot exceeds a predefined threshold.

Example 25 includes the subject matter of any one of Examples 17-24, wherein identifying whether a pixel of the plurality of pixels is unassociated with the first plot includes determining whether a value of the pixel is not equal to the value of the first pixel associated with the first plot.

Example 26 includes the subject matter of any one of Examples 17-25, wherein the first image is associated with metadata, the metadata having at least one source definition that corresponds with a second plot depicted within the first image, the second plot being different than the first plot and having an associated pixel color value different than the value of the first pixel associated with the first plot.

Example 27 includes the subject matter of Example 26, wherein identifying whether a pixel of the plurality of pixels is unassociated with the first plot includes determining whether the difference between a value of the pixel and the associated pixel color value of the second plot is within a predefined threshold.

Example 28 includes the subject matter of any one of Examples 26-27, wherein identifying whether a pixel of the plurality of pixels is unassociated with the first plot includes determining whether the value of the pixel is equal to the associated pixel color value of the second plot.

Example 29 includes the subject matter of any one of Examples 17-28, wherein each pixel of the plurality of pixels is a Red, Green, Blue (RGB) pixel value, and wherein adjusting the at least one pixel of the plurality of pixels based on the at least one pixel being identified as associated with the first plot includes multiplying each R, G and B value of the RGB pixel value by a predetermined value, the predetermined value being greater than 1.0 to increase pixel brightness.

Example 30 includes the subject matter of any one of Examples 17-29, wherein each pixel of the plurality of pixels is a Red, Green, Blue (RGB) pixel value, and wherein adjusting the at least one pixel of the plurality of pixels based on the at least one pixel being identified as unassociated with the first plot includes multiplying each R, G and B value of the RGB pixel value by a predetermined value, the predetermined value being less than 1.0 to decrease pixel brightness.

Example 31 includes the subject matter of any one of Examples 17-30, wherein the first image is a Joint Photographic Experts Group (JPEG), a Graphics Interchange Format (GIF), a Portable Network Graphics (PNG), or a bitmap file.

Example 32 discloses a non-transitory computer-readable medium having a plurality of instructions encoded thereon that when executed by at least one processor cause a process to be carried out, the process being configured to receive a first image that depicts a graph having a plurality of plots, the first image having a plurality of pixels, determine a location of user-input corresponds with a first plot of the plurality of plots within the first image based on a first pixel at the location of the user-input, for each pixel of the plurality of pixels, identify whether a pixel is associated with the first plot or unassociated with the first plot based on a value of the first pixel, and adjust at least one pixel of the plurality of pixels based on the at least one pixel being identified as associated or unassociated with the first plot, and generate an altered image based at least in part on the at least one adjusted pixel.

Example 33 includes the subject matter of Example 32, the process further configured to determine the first image includes a graph based on metadata associated with the first image.

Example 34 includes the subject matter of Example 33, wherein the metadata comprises hypertext markup language (HTML).

Example 35 includes the subject matter of Example 33, wherein the metadata includes a source identifier, the source identifier providing one or more definitions that correlate a graph source with a color of a curve associated with the graph source.

Example 36 includes the subject matter of Example 33, wherein the metadata includes a background color value definition.

Example 37 includes the subject matter of any one of Examples 32-36, wherein identifying whether a pixel of the plurality of pixels is associated with the first plot includes determining whether the difference between a value of the pixel and the first pixel associated with the first plot is within a predefined threshold.

Example 38 includes the subject matter of any one of Examples 32-37, wherein identifying whether a pixel of the plurality of pixels is associated with the first plot includes determining whether a value of the pixel is equal to the value of the first pixel associated with the first plot.

Example 39 includes the subject matter of any one of Examples 32-38, wherein identifying whether a pixel of the plurality of pixels is unassociated with the first plot includes determining whether the difference between a value of the pixel and the value of the first pixel associated with the first plot exceeds a predefined threshold.

Example 40 includes the subject matter of any one of Examples 32-39, wherein identifying whether a pixel of the plurality of pixels is unassociated with the first plot includes determining whether a value of the pixel is not equal to the value of the first pixel associated with the first plot.

Example 41 includes the subject matter of any one of Examples 32-40, wherein the first image is associated with metadata, the metadata having at least one source definition that corresponds with a second plot depicted within the first image, the second plot being different than the first plot and having an associated pixel color value different than the value of the first pixel associated with the first plot.

Example 42 includes the subject matter of Example 41, wherein identifying whether a pixel of the plurality of pixels is unassociated with the first plot includes determining whether the difference between the value of the pixel and the associated pixel color value of the second plot is within a predefined threshold.

Example 43 includes the subject matter of any one of Examples 41-42, wherein identifying whether a pixel of the plurality of pixels is unassociated with the first plot includes determining whether the value of the pixel equal to the associated pixel color value of the second plot.

Example 44 includes the subject matter of any one of Examples 32-43, wherein each pixel of the plurality of pixels is a Red, Green, Blue (RGB) pixel value, and wherein adjusting the at least one pixel of the plurality of pixels based on the at least one pixel being identified as associated with the first plot includes multiplying each R, G and B value of the RGB pixel value by a predetermined value, the predetermined value being greater than 1.0 to increase pixel brightness.

Example 45 includes the subject matter of any one of Examples 32-44, wherein each pixel of the plurality of pixels is a Red, Green, Blue (RGB) pixel value, and wherein adjusting the at least one pixel of the plurality of pixels based on the at least one pixel being identified as unassociated with the first plot includes multiplying each R, G and B value of the RGB pixel value by a predetermined value, the predetermined value being less than 1.0 to decrease pixel brightness.

Example 46 includes the subject matter of any one of Examples 32-45, wherein the first image is a Joint Photographic Experts Group (JPEG), a Graphics Interchange Format (GIF), a Portable Network Graphics (PNG), or a bitmap file.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A computer-implemented method for analyzing a rendered graph, comprising:
   receiving a first static image, generated from a data source, that depicts a graph having a plurality of plots, the first static image having a plurality of pixels;
   displaying the first static image, wherein the first static image is disconnected from the data source;
   determining, by a processor, a location of user-input corresponds with a first plot of the plurality of plots within the first static image based on a first pixel at the location of the user-input;
   identifying a corresponding value for each pixel of the plurality of pixels;
   identifying by the processor, using the corresponding value for each pixel, whether a pixel is associated with the first plot or unassociated with the first plot based on a value of the first pixel;
   identifying a background color value of the first static image;
   adjusting, by the processor, the corresponding value for each unassociated pixel of the plurality of pixels to the background color value; and
   generating, by the processor, an altered image based on the adjusting of the corresponding value for each unassociated pixel of the plurality of pixels, the altered image increasing visibility of the first plot.

2. The computer-implemented method of claim 1, further comprising determining the first static image includes a graph based on metadata associated with the first static image.

3. The computer-implemented method of claim 2, wherein the metadata includes a source identifier, the source identifier providing one or more definitions that correlate a graph source with a color of a curve associated with the graph source.

4. The computer-implemented method of claim 1, wherein identifying by the processor whether a pixel of the plurality of pixels is associated with the first plot includes determining whether a difference between a value of the pixel and the value of the first pixel is within a predefined threshold.

5. The computer-implemented method of claim 1, wherein identifying by the processor whether a pixel of the plurality of pixels is unassociated with the first plot includes determining whether a difference between the value of the pixel and the value of the first pixel associated with the first plot exceeds a predefined threshold.

6. The computer-implemented method of claim 1, wherein the first static image is associated with metadata, the metadata having at least one source definition that corresponds with a second plot depicted within the first static image, the second plot being different than the first plot and having an associated pixel color value different than the value of the first pixel associated with the first plot.

7. The computer-implemented method of claim 6, wherein identifying by the processor whether a pixel of the plurality of pixels is unassociated with the first plot includes determining whether a difference between a value of the pixel and the pixel color value of the second plot is within a predefined threshold.

8. The computer-implemented method of claim 1, wherein each pixel of the plurality of pixels has a Red, Green, Blue (RGB) pixel value, and wherein adjusting, by the processor, at least one pixel being identified as associated with the first plot includes multiplying each R, G and B value of the RGB pixel value by a predetermined value, the predetermined value being greater than 1.0 to increase pixel brightness.

9. The computer-implemented method of claim 1, wherein each pixel of the plurality of pixels has a Red, Green, Blue (RGB) pixel value, and wherein adjusting, by the processor, the corresponding value for each unassociated pixel of the plurality of pixels includes multiplying each R, G, and B value of the RGB pixel value by a predetermined value, the predetermined value being less than 1.0 to decrease pixel brightness.

10. The computer-implemented method of claim 1, wherein the first static image is a Joint Photographic Experts Group (JPEG), a Graphics Interchange Format (GIF), a Portable Network Graphics (PNG), or a bitmap file.

11. The computer-implemented method of claim 1, further comprising displaying the altered image in an Internet browser application.

12. A system comprising:
  a memory;
  at least one processor coupled to the memory and configured to:
    receive a first static image, generated from a data source, that depicts a graph having a plurality of plots, the first static image having a plurality of pixels;
    display the first static image, wherein the first static image is disconnected from the data source;
    determine a location of user-input corresponds with a first plot of the plurality of plots within the first static image based on a first pixel at the location of the user-input;
    identify a corresponding value for each pixel of the plurality of pixels;
    identify, using the corresponding value for each pixel, whether a pixel is associated with the first plot or unassociated with the first plot based on a value of the first pixel;
    identify a background color value of the first static image;
    adjust the corresponding value for each unassociated pixel of the plurality of pixels to the background color value; and
    generate an altered image based on the adjusting of the corresponding value for each unassociated pixel of the plurality of pixels.

13. The system of claim 12, the processor further configured to determine the first static image includes a graph based on metadata associated with the first static image.

14. The system of claim 13, wherein the metadata includes a source identifier, the source identifier providing one or more definitions that correlate a graph source with a color of a curve associated with the graph source.

15. The system of claim 12, wherein identifying whether a pixel of the plurality of pixels is associated with the first plot includes determining whether a difference between the value of the pixel and the value of the first pixel associated with the first plot is within a predefined threshold.

16. The system of claim 12, wherein identifying whether a pixel of the plurality of pixels is unassociated with the first plot includes determining whether a difference between a value of the pixel and the first pixel associated with the first plot exceeds a predefined threshold.

17. The system of claim 12, wherein the first static image is associated with metadata, the metadata having at least one source definition that corresponds with a second plot depicted within the first static image, the second plot being different than the first plot and having an associated pixel color value different than the value of the first pixel associated with the first plot.

18. The system of claim 17, wherein identifying whether a pixel of the plurality of pixels is unassociated with the first plot includes determining whether a difference between a value of the pixel and the associated pixel color value of the second plot is within a predefined threshold.

19. The system of claim 12, wherein each pixel of the plurality of pixels has a Red, Green, Blue (RGB) pixel value, and wherein adjusting at least one pixel being identified as associated with the first plot includes multiplying each R, G and B value of the RGB pixel value by a predetermined value, the predetermined value being greater than 1.0 to increase pixel brightness.

20. The system of claim 12, wherein each pixel of the plurality of pixels has a Red, Green, Blue (RGB) pixel value, and wherein adjusting the corresponding value for each unassociated pixel of the plurality of pixels includes multiplying each R, G and B value of the RGB pixel value by a predetermined value, the predetermined value being less than 1.0 to decrease pixel brightness.

21. A non-transitory computer-readable medium having a plurality of instructions encoded thereon that when executed by at least one processor cause a process to be carried out, the process being configured to:
  receive a first static image, generated from a data source, that depicts a graph having a plurality of plots, the first static image having a plurality of pixels;
  display the first static image, wherein the first static image is disconnected from the data source;
  determine a location of user-input corresponds with a first plot of the plurality of plots within the first static image based on a first pixel at the location of the user-input;
  identify a corresponding value for each pixel of the plurality of pixels;
  identify, using the corresponding value for each pixel, whether a pixel is associated with the first plot or unassociated with the first plot based on a value of the first pixel;
  identify a background color value of the first static image;

adjust the corresponding value for each unassociated pixel of the plurality of pixels to the background color value; and generate an altered image based on the adjusting of the corresponding value for each unassociated pixel of the plurality of pixels.

22. The computer-readable medium of claim 21, wherein first static image is associated with metadata, and wherein the metadata includes a source identifier, the source identifier providing one or more definitions that correlate a graph source with a color of a curve associated with the graph source.

23. The computer-readable medium of claim 21, wherein identifying whether a pixel of the plurality of pixels is associated with the first plot includes determining whether a difference between a value of the pixel and the first pixel associated with the first plot is within a predefined threshold.

24. The computer-readable medium of claim 21, wherein identifying whether a pixel of the plurality of pixels is unassociated with the first plot includes determining whether a difference between a value of the pixel and the value of the first pixel associated with the first plot exceeds a predefined threshold.

25. The computer-readable medium of claim 21, wherein the first static image is associated with metadata, the metadata having at least one source definition that corresponds with a second plot depicted within the first static image, the second plot being different than the first plot and having an associated pixel color value different than the value of the first pixel associated with the first plot.

* * * * *